(12) United States Patent
Weyman

(10) Patent No.: US 7,483,999 B2
(45) Date of Patent: Jan. 27, 2009

(54) DISTRIBUTED BRIDGING WITH SYNCHRONIZATION FORWARDING DATABASES

(75) Inventor: Raphael J Weyman, Hemel Hempstead (GB)

(73) Assignee: 3Com Corporation, Marlborough, MA (US)

( * ) Notice: Subject to any disclaimer, the term of this patent is extended or adjusted under 35 U.S.C. 154(b) by 860 days.

(21) Appl. No.: 10/886,575

(22) Filed: Jul. 9, 2004

(65) Prior Publication Data
US 2006/0036765 A1 Feb. 16, 2006

(30) Foreign Application Priority Data
May 27, 2004 (GB) ................................. 0411835.2

(51) Int. Cl.
*G06F 13/00* (2006.01)
(52) U.S. Cl. ....................................... 709/238; 709/245
(58) Field of Classification Search ................. 709/238, 709/245
See application file for complete search history.

(56) References Cited
U.S. PATENT DOCUMENTS
6,735,198 B1 5/2004 Edsall et al.
6,763,023 B1 * 7/2004 Gleeson et al. ............. 370/392
2003/0142680 A1 * 7/2003 Oguchi ....................... 370/400

FOREIGN PATENT DOCUMENTS
EP 0993156 A3 9/2003
GB 2349312 A 10/2000
WO WO 02/15497 A1 2/2002

* cited by examiner

*Primary Examiner*—Kenneth R Coulter

(57) ABSTRACT

A network unit for use in a distributed bridging fabric has a multiplicity of user ports for the transmission of data frames to and from an external network and at least one fabric port for the transmission of frames between the network unit and another unit in the fabric. The network unit has a forwarding database for containing entries each including a media access control address, and a lookup engine organized for the insertion of an entry into the forwarding database when the network unit receives a data packet at a user port. The unit broadcasts via each fabric port of an "address added" message identifying a respective media access control address. The lookup engine also responds to such an "address added" message received from another unit to make a corresponding entry in the database and to annotate an entry to indicate activity of an address in response to an address which is already in the database. The network unit has an aging engine organized for the polling of entries in the database. The aging engine refreshes an entry for which the respective media access control address is annotated as active and is organized for the selective removal of inactive entries from the database.

35 Claims, 15 Drawing Sheets

DISTRIBUTED BRIDGING WITH SYNCHRONIZATION FORWARDING DATABASES

FIELD OF THE INVENTION

This invention relates to packet-switched communication networks, particularly though not exclusively those employing media access control (MAC) addressing and network (IP) addressing of packets. More particularly the invention relates to a fabric of units organised to provide distributed bridging and units intended for or capable of use in such a fabric. Herein 'bridging' refers to the forwarding of a frame or packet according to its 'layer 2' (Media Access Control) addressing.

BACKGROUND TO THE INVENTION

It is known, particularly for network switches, to interconnect a multiplicity of network units into a switching 'fabric' so that in effect, and particularly in relation to the external network, the units act as a single network entity. One of the purposes of a fabric of network units is the provision of 'resiliency' that is to say the ability of the switching fabric to continue operation, so far as is feasible, notwithstanding a fault in or removal of one of the units of the fabric or one of the links connecting the units of the fabric. Early forms of such a fabric were in the form of a daisy chain or ring although more recently mesh forms of a fabric have been developed; and the invention is applicable in all such forms.

Where several individual data-switching units are connected to form a single distributed fabric, the bridging functionality may be distributed amongst the individual units within the fabric. Preferably the entire fabric appears to other network entities as if it were a single bridge. It is desirable to share the workload between the units as much as possible, to maximize the data forwarding performance, and to minimize the dependence on any single unit or connection within the fabric.

The functionalities required of a bridge may be divided into two broad categories; data plane, and control plane. The data plane functionalities relate directly to the forwarding of the data traffic, and the control plane functionalities relate to the overhead activities of establishing the topology of the LAN (Local Area Network) in which the bridge is deployed. More specifically, the data plane includes the VBridges, the fabric ports, the user ports, and the forwarding databases. The control plane includes the protocol entities, which may include in practice, for bridges, LACP (Link Aggregation Control Protocol), and STAP (Spanning Tree Algorithm and Protocol).

'VBridge' is a term used herein to mean a bridge which can forward data traffic only within one VLAN (Virtual Local Area Network). If a network is not partitioned into virtual local area networks the term VBridge is synonymous with 'bridge'.

There must appear to be only one forwarding database for each VBridge throughout the fabric, and the entire fabric must appear to be a single entity to the protocols so that the fabric will be a single node in the LAN topology.

In order to be able to function as a bridge, a single unit must include at least one VBridge incorporating a forwarding database that has entries each relating a MAC (media access control) address to forwarding data, e.g. an identification of a port from which a frame having that MAC address as a destination address should be sent, and at least two user ports, i.e. physical ports which are not fabric ports, User ports are the unit's physical data interface to entities outside the fabric. In order to form part of a distributed fabric with bridge functionality, a single unit must include at least one 'fabric port'. A fabric port, which may be either dedicated or configured as such, is a physical port that is used only to connect a unit to another unit within the fabric. Fabric ports and the links between them are always within the fabric so they neither receive frames from nor transmit frames to the external network and are not 'visible' to entities outside the fabric.

In practice, a product specified to be able to form part of a fabric with bridging functionality would typically include multiple VBridges (as many VBridges as there is VLAN connectivity specified for the unit), multiple forwarding databases (one per VBridge), multiple user ports, and one or more fabric ports.

Multiple single bridge units may be connected through their fabric ports to form a distributed fabric, the maximum number of units in the fabric and the topology of the fabric being dependent on the product itself.

The bridging of data traffic through a distributed fabric must appear to be identical to the bridging of data traffic through a single unit. Traffic must be forwarded from an ingress user port to an egress user port identically regardless of whether the user ports are on the same unit or are on different units within the fabric. Traffic should also be filtered identically regardless of which unit has the user ports. If a single unit bridge is able to control the forwarding of a particular frame directly to the egress user port with no flooding of the frame to other user ports, then a distributed fabric's bridge should likewise not flood the traffic to other user ports.

SUMMARY OF THE INVENTION

An important aspect of achieving for a distributed bridging entity common forwarding functionality and identity of occurrence of flooding throughout the entity is the synchronization of the various forwarding databases.

The present invention accordingly concerns a network unit, intended for use in a distributed fabric, which can co-operate with the other units in the fabric to achieve explicit synchronization of the forwarding databases.

One aspect of explicit synchronization according to the invention is the broadcasting of a learning event (i.e. the entry of a locally sourced MAC address) to the other units in the fabric. This is preferably achieved by means of special fabric database maintenance packets (herein called 'maintenance packets') which be transmitted only via fabric ports and which will cause the search or look-up engines in the other bridges to make corresponding entries, which are preferably annotated to indicate that they have been 'remotely' sourced.

Another aspect of explicit synchronization according to the invention is the aging of entries in the databases, to remove entries which are not 'active'. This may be achieved in a variety of ways, which produce in general different volumes of maintenance traffic across the fabric.

A further feature of the invention is the purging or resynchronization of a unit's database when another unit joins or leaves the fabric.

Further features of the invention will become apparent from the following description of examples with reference to the accompanying drawings.

DETAILED DESCRIPTION

In order to indicate the context of the invention, reference will first be made to FIGS. 1 to 8.

Figure 1:
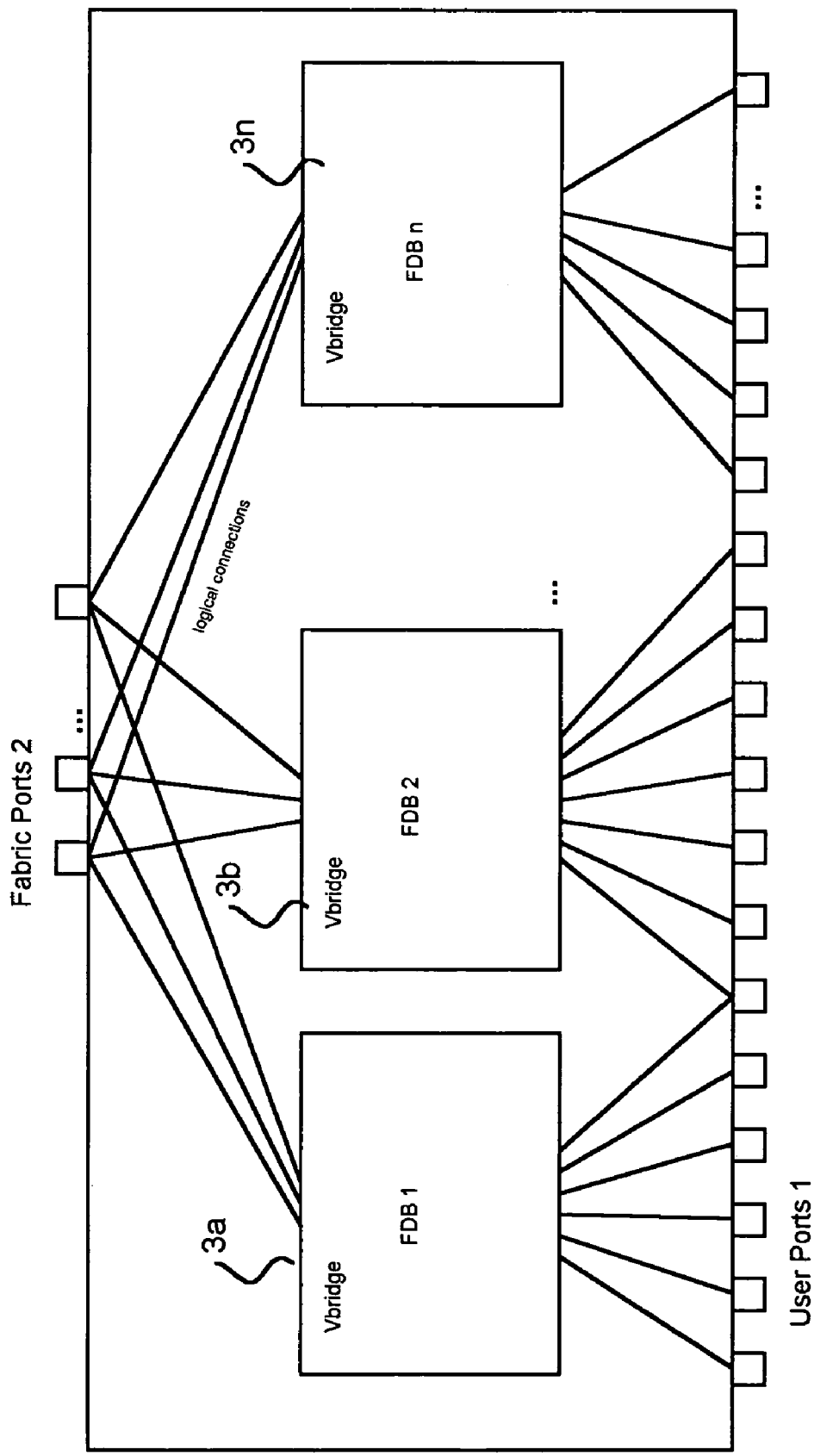
FIG. 1 illustrates a single bridge intended for use in a distributed fabric.

FIG. 1 illustrates by way of example a single bridge unit 8, which has user ports 1, fabric ports 2 and VBridges 3a, 3b . . . 3n. Each VBridge has its own forwarding database FDB1, FDB2 etc. As is well known a Vbridge has two important features, namely 'forwarding' and 'learning'.

For forwarding, the database is accessed by means of a search key (e.g. a 'destination address') to obtain the forwarding data, usually a port number, for the packet. The access mechanism depends on the nature of the database. It may be a trie database, a CAM (content addressable memory) or a database accessed by hashing the destination address and so on.

For learning, the source address of the packet is checked (using a look-up process similar to that for forwarding) to determine whether the source address is the subject of an entity in the database. If it is not, the source address and 'forwarding data' (i.e. the port on which the packet was received) is learned by the database, so that the forwarding data can be recovered when the bridge receives a packet of which the destination address (DA) corresponds to the stored or learnt source address. It will be presumed that the forwarding databases all have the (well-known) forwarding and learning facilities just described.

Another known feature of forwarding databases is aging. There are several forms, but in essence each entry is (subject to some exclusions) automatically removed from the databases by means of an aging clock. For example, each entry may have a field, which indicates either the age of the entry or the time period within which the entry was made. Periodically the database is scanned to effect removal of those entries, which are too old according to the selected aging criterion.

In practice the aging procedure has two other preferred features. One is that selected entries (such as static addresses) may be immune to the aging procedure, for example by the provision of an 'AGING OK' field that has to be set to permit aging. Another feature is 'refreshing'. This feature allows the updating of the aging field associated with the entry on the reception of a packet, which has a source, MAC address that is already in the database. Depending on how age is represented, the refreshing may be effected either by resetting the age of the entry to zero or by resetting the age to the current time according to the aging clock.

The particular mechanism is in general unimportant. Essentially the aging mechanism acts to remove, or at least select for removal, those entries which on the criteria employed are not 'active' within some time interval, which depends on the design and the nature of the traffic.

VBridges

Any VBridge may connect to any of the user ports within a unit. Where more than one VBridge is connected to a particular user port, the traffic passing through that port would normally be tagged with a VLAN identifier according to IEEE Standard 802.1q so that each VLAN's traffic is logically separate. Where only one VBridge is connected to a user port, it would not normally be necessary for the traffic to be tagged with a VLAN identifier for separation.

So that any VBridge appears to be continuous across all of the units within a fabric, every unit in a fabric would normally need to implement the same set of VBridges and each implemented VBridge must have connectivity through the fabric ports to its counterpart in every other unit. Since the links between the fabric ports on the units must carry traffic for each of the VBridges, and since the logical separation of each VBridge must be maintained, all traffic carried by the links between the fabric ports must carry some means of identifying which VLAN the traffic is for.

Most products allow the 'creation' and 'destruction' of VBridges. Where VBridges are created or destroyed in a distributed fabric, the creation or destruction must be synchronized across the units so that every unit continues to implement the set of VBridges required so that each VBridge appears to be continuous through the fabric. Simultaneously with this, when a VBridge is created or destroyed, the corresponding logical link within the fabric link must be created or destroyed. Also, where a fabric is established by connecting units that have differing VBridges implemented, there must be some method of synchronizing the VBridges and fabric link logical connections.

Figure 2:
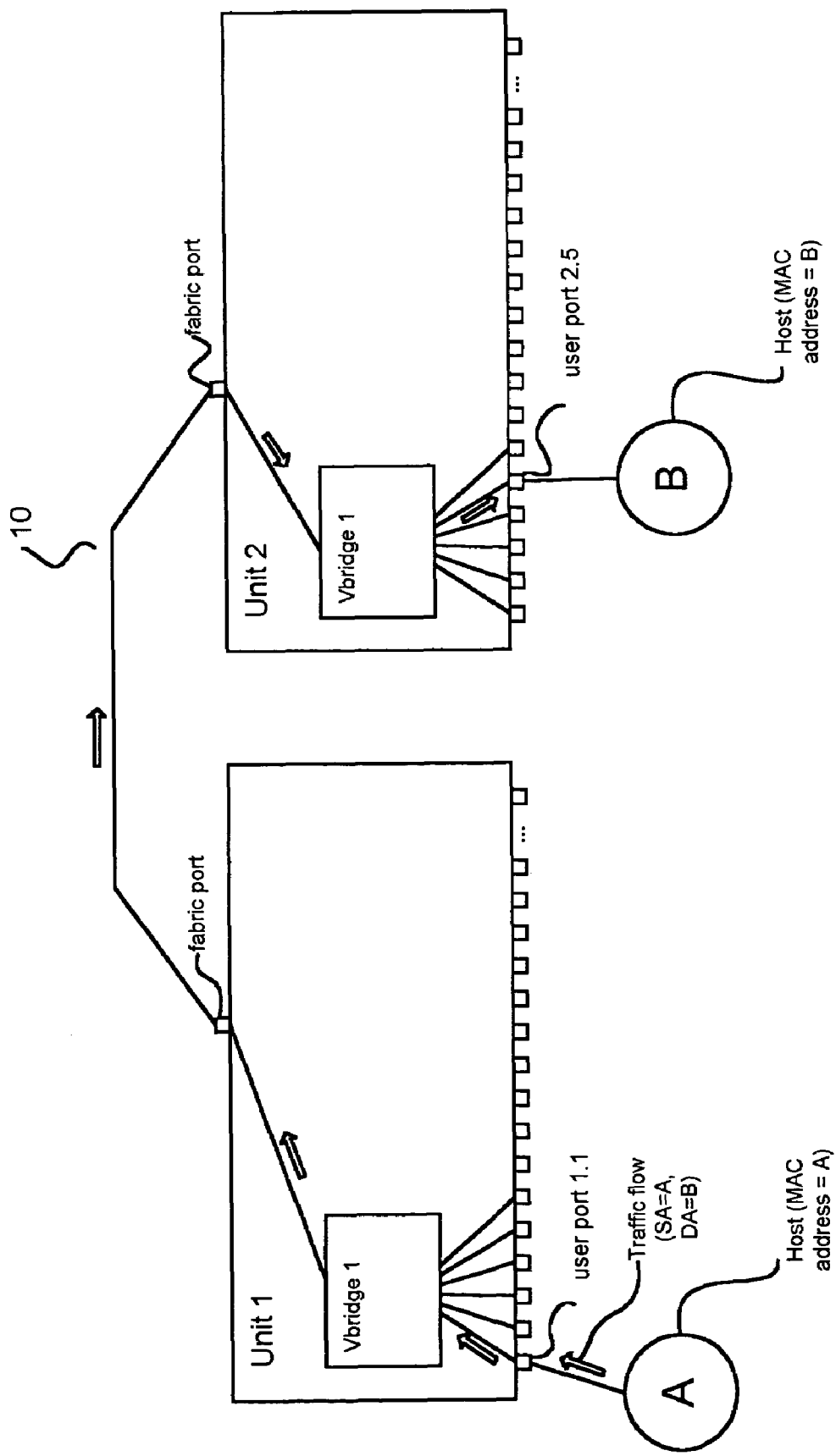
FIG. 2 illustrates a basic distributed fabric comprising two bridges and a fabric link.

FIG. 2 shows a distributed fabric consisting of two units 1 and 2 connected by a single fabric link. Host A is connected to user port 1.1 on unit 1 and host B is connected to user port 2.5 on unit 2. It is assumed that host A and host B have been having a bi-directional MAC-addressed conversation and so the distribute bridge that connects them has had an opportunity to learn both of their MAC addresses.

Only the traffic flow form host A to host B is shown, the traffic having a MAC source address (SA) of 'A' and a MAC destination address (DA) of 'B'. It may be assumed that the traffic flow from host B to host A is similar in the opposite direction and with opposite MAC addressing.

Since the user port to which host B is connected is on unit 2, the Vbridge in unit 1 forwards the traffic only to its fabric port. Unit 1 does not flood the traffic to any of its user ports. When unit 2 receives the traffic from its fabric port, it forwards it directly to user port 2.5 and does not flood it to any other user port.

Figure 3:
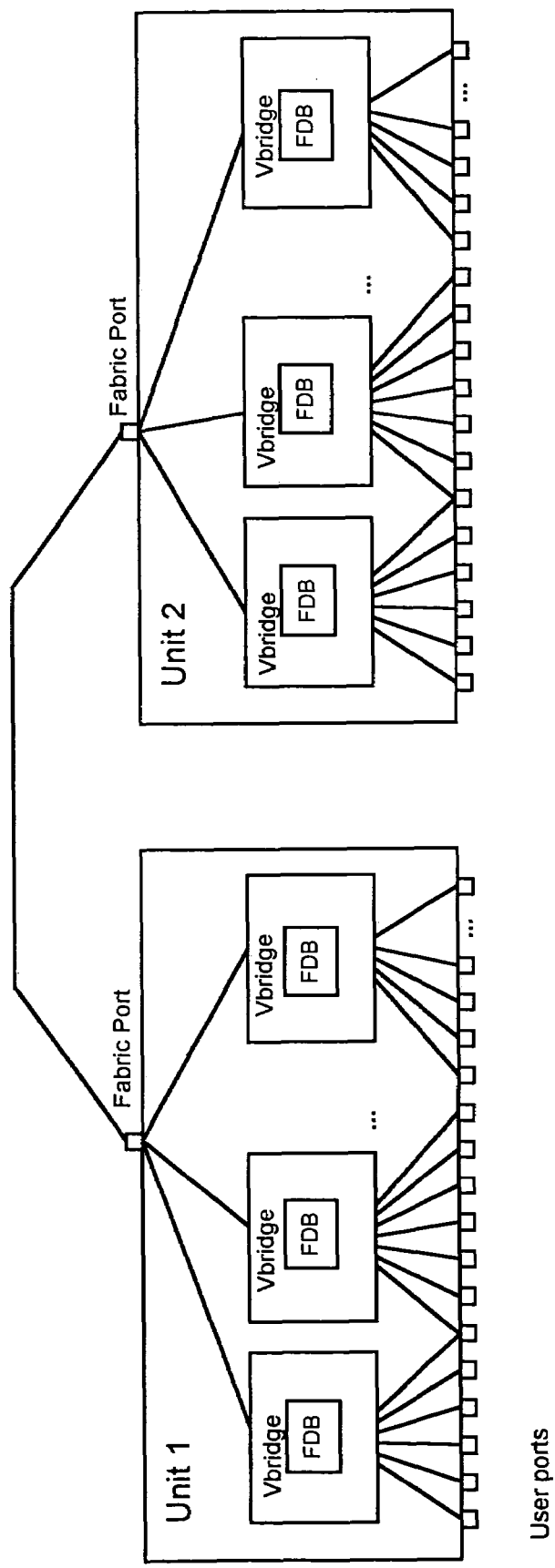
FIG. 3 illustrates a basic distributed fabric comprising two units each containing a multiplicity of Vbridges.

FIG. 3 is an example of two units Unit 1 and Unit 2 each having the same general layout as the unit shown in FIG. 1, connected through a single fabric link 10 (between the fabric ports 2) to form a distributed fabric. The actual connection topologies and number of fabric ports involved depend on the product's capabilities, but the principles are the same regardless of the fabric's topology.

Since the fabric ports may not be connected to any unit outside of the fabric, it does not matter what mechanism is user to identify the traffic so that the VLANs carried by the fabric links may be kept logically separate. An example of a suitable mechanism would be the addition of a VLAN tag according to IEEE Standard 802.1q to all fabric link traffic. Normally, the mechanism employed is defined by a product's hardware capabilities.

Figure 4:
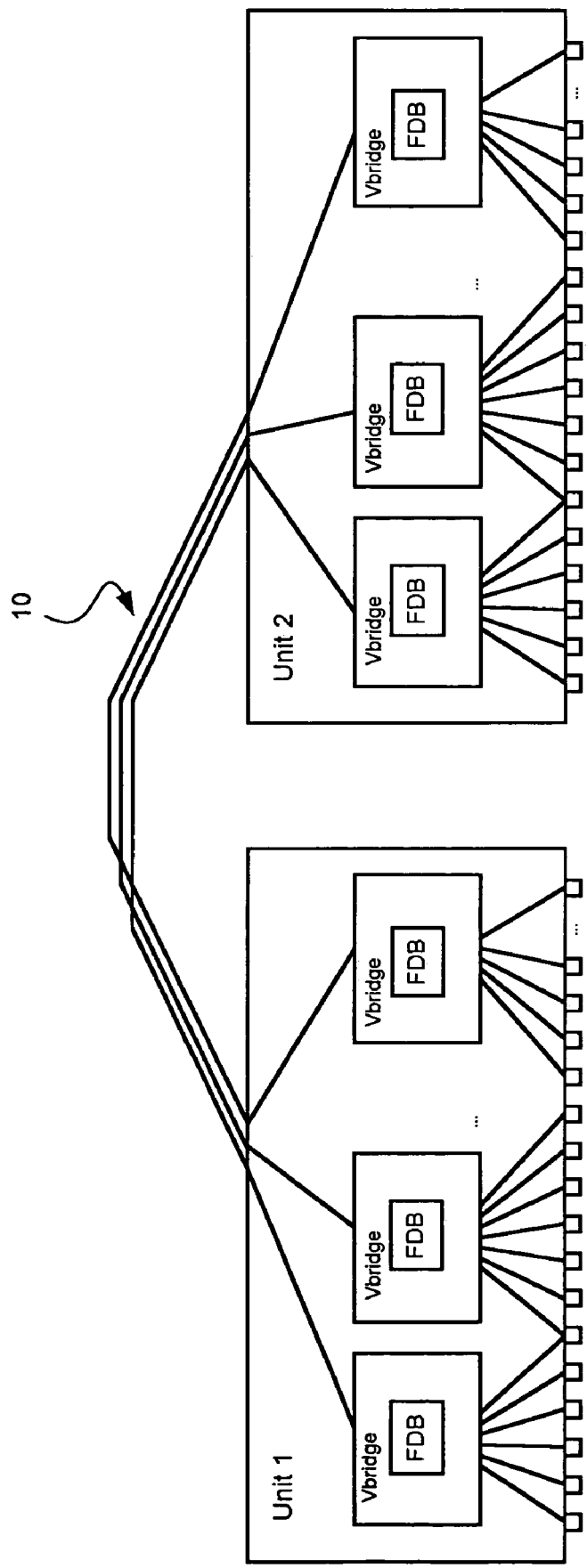
FIG. 4 is similar to FIG. 3 and shows the logical separation of traffic on different VLANs.

FIG. 4 resembles FIG. 3 but diagrammatically shows the three logically separated traffic flows on the single physical fabric link. Each VBridge in each unit has its own logical connection to its counterpart in the other unit. There are as many logically separated connections through each fabric link as there are VBridges in the distributed fabric switch.

Forwarding Databases

Each VBridge forwards MAC addressed frames and learns MAC address locations into a forwarding database in accordance with IEEE Standards 802.1d and 802.1q.

Each VBridge should contain its own logically separate address databases. This means that a MAC address learned (according to IEEE Standard 802.1d) within one VLAN would not be available to VBridges forwarding within other VLANs.

Each forwarding database within each unit in the fabric contains, for each MAC address, the port on which that MAC address was learned (and so the port to which to forward any traffic destined to that MAC address). Within each units forwarding database, the port against which a MAC address is learnt may be either a user port or a fabric port and, where it is a fabric port, at least one other unit in the fabric would have to further forward any traffic destined to that MAC address toward a user port. In this way, traffic destined to a particular MAC address may be forwarded by several VBridges within several units with all but the last of the VBridges in the flow being directed by its forwarding database to forward the traffic to a fabric port. Ultimately the last unit in the flow must forward the traffic to a user port and so its forwarding database would have the appropriate user port against the MAC address.

It is feasible to provide direct hardware support for the learning of MAC addresses directly against any user port within the fabric, regardless of which unit the user port resides on. The hardware then identifies when a user port is on another unit and forwards traffic for that user port to a fabric port instead. On these products, it is not necessary to reference the fabric ports in the forwarding databases and an identifier for the user port is used instead. The identifier for each user port must then be unique within the entire distributed fabric.

Each frame forwarded by the fabric's bridging functionality enters the fabric at a user port and, ultimately, exits the fabric at a user port. The possibility that the frame may have to be forwarded across one or more fabric links and be forwarded independently by more than one unit's VBridge does not change the appearance that the fabric is a single bridge. However, to maintain the appearance of being a single bridge, only a single forwarding database per distributed VBridge should appear at any management interface. To achieve this, any forwarding database entries containing a fabric port must not be shown at the user interfaces.

Figure 5:
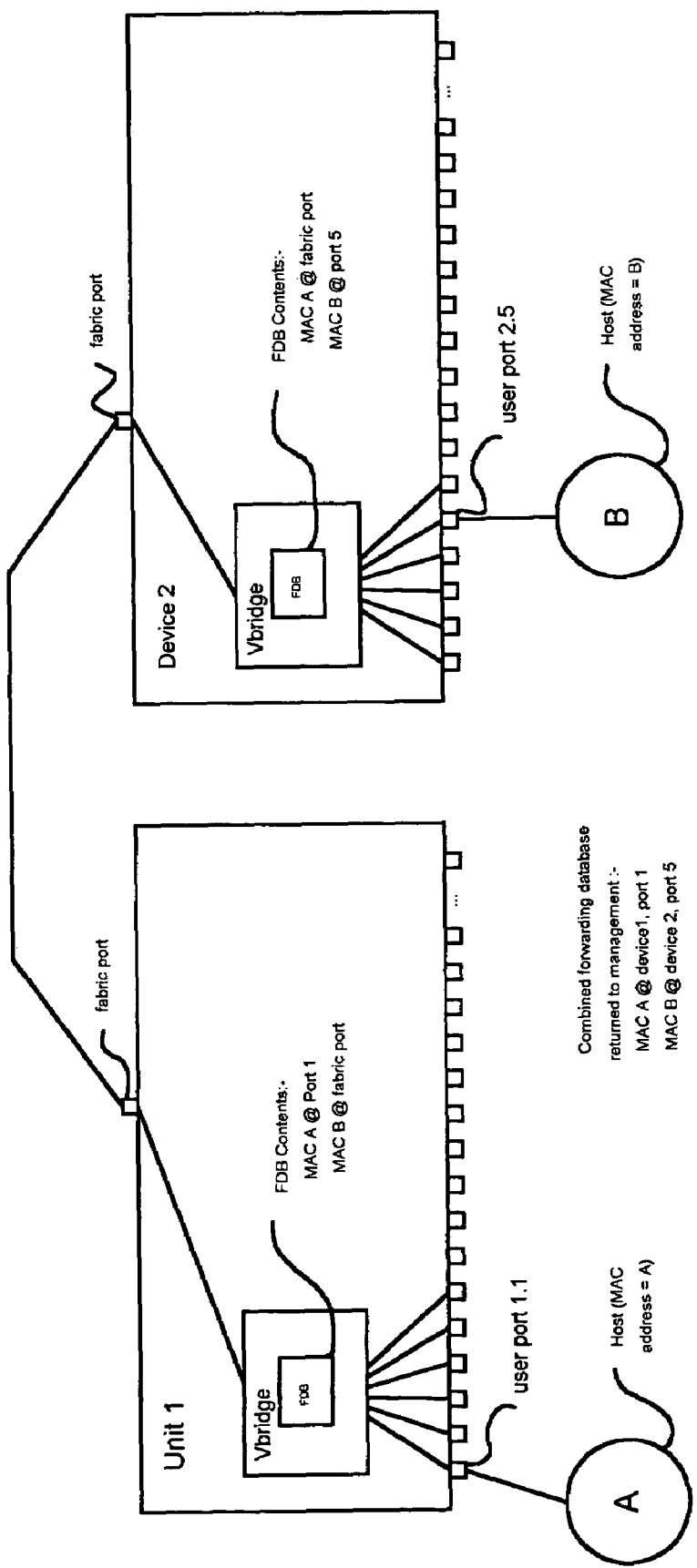
FIG. 5 illustrates communication between units in a distributed fabric.
Figure 6:
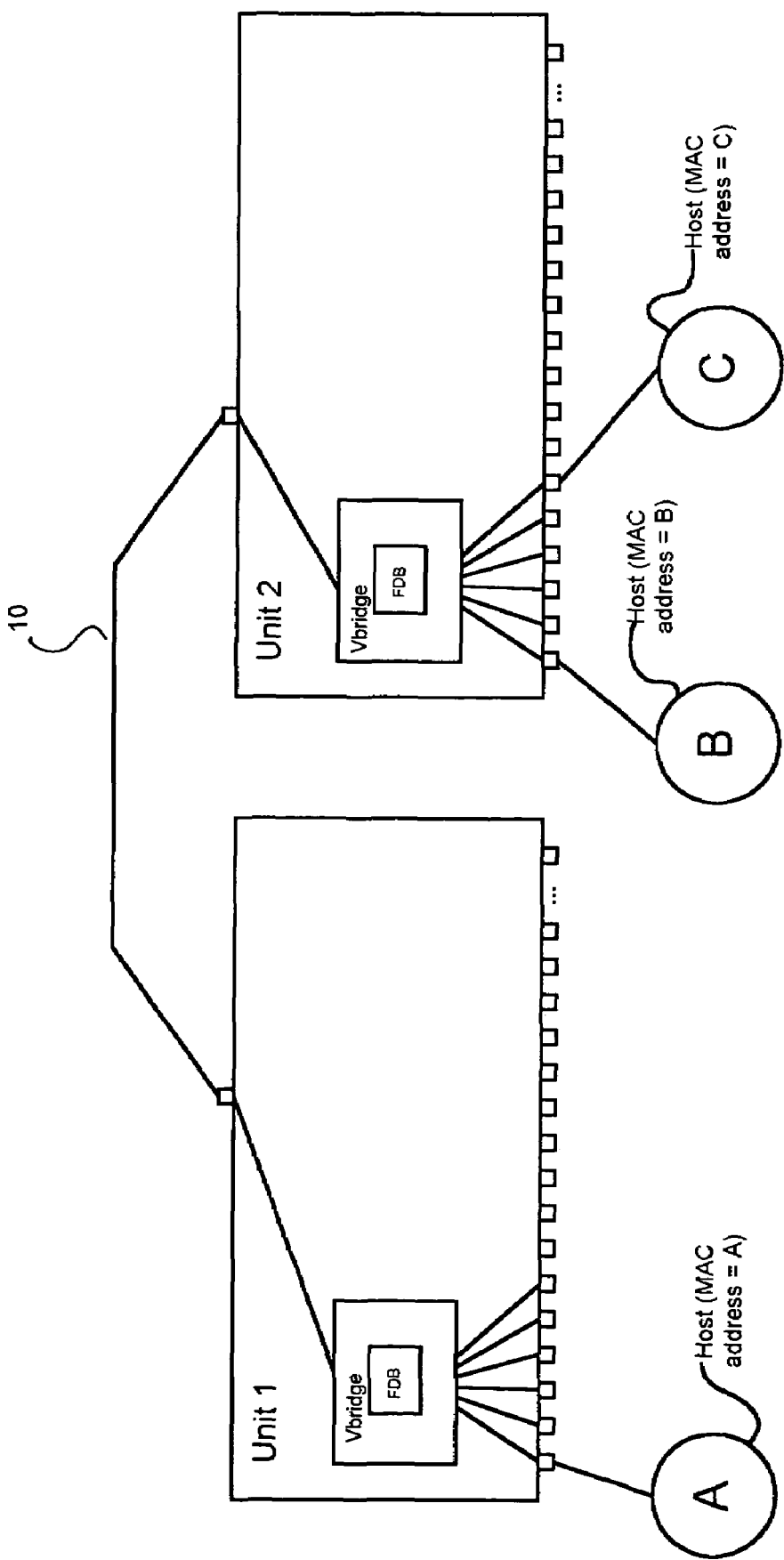
FIG. 6 illustrates implicit synchronization in a distributed fabric.

FIG. 5 shows by way of example the fabric consisting of two units, Unit 1 and Unit 2 connected by a single fabric link 10 as before. The units in this example do not have hardware support for the direct referencing of user ports residing on different units. Each unit contains only one VBridge (VBridge 1) each containing a forwarding database. Host A is connected to a user port 1.1 on unit 1 and host B is connected to a user port 2.5 on unit 2. The forwarding database of each unit's VBridge has an entry for the MAC address of both hosts with the fabric port learned against the MAC address connected to the other unit. The forwarding database report returned via a management user interface (not shown) is the combination of both VBridges' forwarding databases' contents but with the entries containing the fabric ports suppressed to leave only the entries containing a user port.

Unit or Fabric Link Loss

Whenever a unit disappears from a distributed fabric or a fabric link loses connectivity the remaining units may have to modify the contents of their forwarding databases.

Any MAC addresses learnt against a fabric port must be removed from all forwarding databases if that fabric port loses connectivity.

If connectivity to a particular unit is lost, all of the remaining units in the fabric must remove from their forwarding databases any MAC addresses learnt against a user port on the lost unit.

Address Learning

Each forwarding database in each VBridge in each unit learns MAC addresses in accordance with IEEE Standard 802.1d. Whenever MAC addressed traffic arrives at any port (fabric or user) of a unit, the unit has an opportunity to learn the MAC source address of the traffic and to populate the forwarding database of the appropriate VBridge with the MAC address against the port through which the traffic arrived.

If each unit were to take opportunities to learn MAC addresses independently of the other units in the fabric then, in most cases, the MAC address would be learnt consistently by all of the units that the traffic traverses. The resultant forwarding databases in each unit would contain entries that are effectively synchronized with each other to allow traffic to be forwarded through the fabric as if the fabric were a single switch. This independent learning toward a consistent set of forwarding databases is called herein "implicit synchronization".

Although implicit synchronization of the forwarding databases in the fabric works in most cases, there are several scenarios in which at least one of the units in the fabric does not receive an opportunity to learn a MAC address to which it is required to forward traffic. In these cases, if implicit synchronization is the only synchronization mechanism supported, then the unit has no choice but to 'flood' the traffic. This is, clearly, undesirable. The general solution to these cases is to have the forwarding databases of each unit communicate directly with their counterparts in the other units to share the learnt MAC addresses. This is called "explicit synchronization".

Implicit Synchronization

As indicated above, implicit synchronization of the forwarding databases is achieved when each VBridge of each unit in the fabric learns addresses into its forwarding databases directly from the source MAC addresses of the traffic forwarded by the unit. Normally, since every unit in the path between the ingress user port and the egress user port forwards traffic, every unit with a need to learn the MAC address will have the opportunity to learn it and every unit in the fabric may control traffic forwarding and filtering consistently.

Implicit forwarding database synchronization works in circumstances when all units in the fabric see required MAC addresses as source addresses and so have an opportunity to learn. In the example shown in FIG. 6, if Host A sends MAC addressed traffic to Host B, then the traffic will be forwarded by both Unit 1 and Unit 2 and the respective VBridge in both units will have the opportunity to learn MAC address A. If host B now sends MAC addressed traffic back to Host A then the traffic will again be forwarded by both units and the respective VBridge in both units will have the opportunity to learn MAC address B. Traffic may now flow between Host A and Host B in either direction; both units are able to control the traffic fully so that no flooding need occur.

If Host C now sends traffic to Host B then, because the respective VBridge 1 in Unit 2 has already learnt MAC address B, the traffic will be forwarded directly to host B and no flooding will result. Only Unit 2 will, therefore, have an opportunity to learn MAC address C. A further traffic stream from Host A to Host C would now be controlled by the VBridge in Unit 2, but would be flooded by the VBridge in Unit 1. In this scenario the forwarding databases have not been implicitly synchronized and the fabric would not behave identically to a single switch.

Another example of where the forwarding databases would not be synchronized implicitly is where a distributed router is implemented as described in U.S. 2003-0147412-A1 (Weyman et al). As is described therein, the unit that first receives the traffic routes it and then, if the egress port is on a different unit, it is bridged through the distributed bridge functionality to the egress port. This means that only the ingress unit will have the opportunity to learn the source MAC address. The result of this is that any traffic routed by the distributed router would be partially flooded unless additional MAC address learning opportunities were presented.

Figure 7:
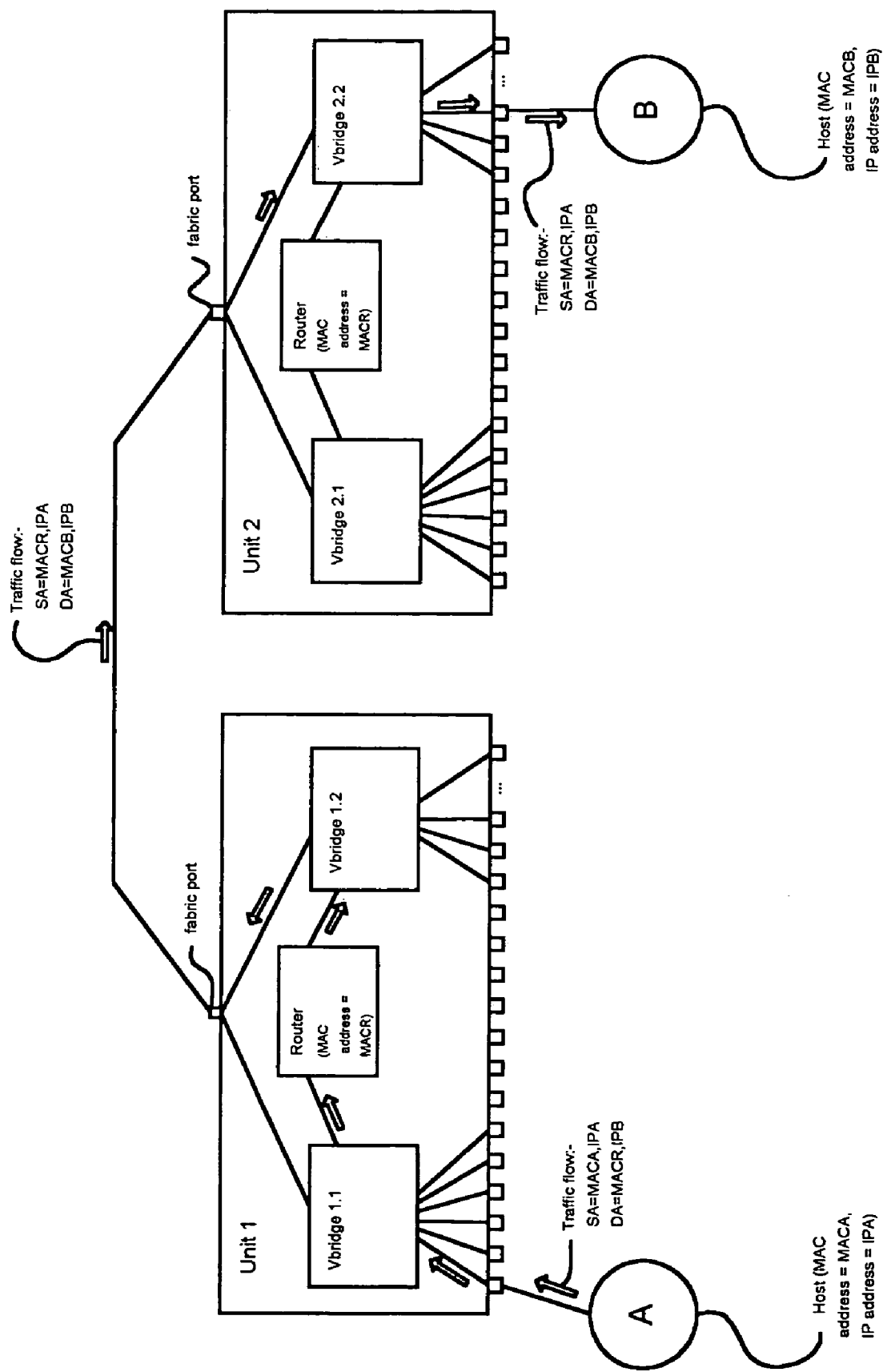
FIG. 7 illustrates the occurrence of flooding in a distributed fabric.
Figure 8:
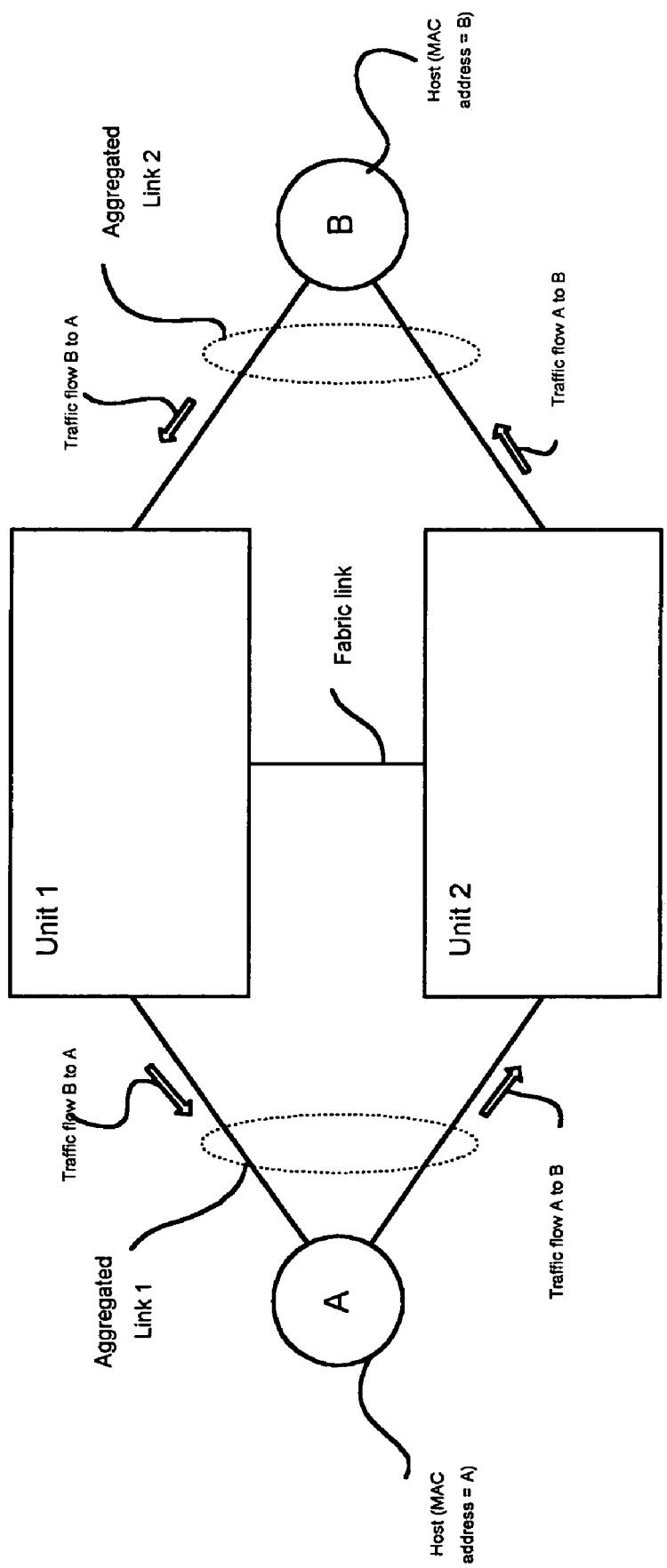
FIG. 8 illustrates a distributed fabric including aggregated links

FIG. 7 shows an example of the traffic flow through a distributed fabric including both a distributed bridge and a distributed router. Host A, with a MAC address of 'MACA' and an IP address of 'IPA' is connected to unit 1. Host B, with a MAC address of 'MACB' and an IP address of 'IPB' is connected to unit 2. The distributed router itself has a MAC address of 'MACR'. This may be achieved as described in Weyman et al., supra, by the lending of a MAC address by Unit 1 to Unit 2.

Only the traffic flow from host A to host B is shown, but it may be assumed that there is also a symmetrical traffic flow from host B to host A. Host A is connected to VBridge 1.1 but host B is connected to VBridge 2.2. Because of this the traffic is required to traverse the router. Host A sends its traffic to the MAC address of the router and so it is bridged to the router Ra in unit 1. Unit 1's router forwards the traffic on to VBridge 1.2 but in doing so changes the MAC DA to be MACB and the MAC SA to be MACR. Unit 2 receives the traffic into VBridge 2.2 and, since it is now addressed to MACB, bridges it directly to the user port on which host B is connected. Unit 2 never gets an opportunity to learn MAC address A. Opposite direction traffic from host B to host A would be routed in unit 2 and, when forwarding onward to MACA, would be flooded to all user ports by unit 2.

Explicit Synchronization

Accordingly, in order to avoid excessive traffic flooding especially when implicit synchronization of the forwarding databases is not sufficient, the present invention employs explicit synchronization. It may be used either in addition to, or entirely instead of, implicit synchronization.

Explicit synchronization requires that the forwarding databases of the VBridges communicate directly with each other and exchange knowledge of the MAC addresses required by each VBridge. Where explicit synchronization is used in support of implicit synchronization, the MAC address knowledge exchange may be limited to the required information that was not synchronized implicitly. Where explicit synchronization is used without implicit synchronization no VBridge would learn MAC addresses directly against the fabric port and so all MAC address information would need to be exchanged between units.

Explicit synchronization could theoretically be achieved by each unit letting all other units know about all addresses it has in its forwarding databases. This is relatively simple and does not require any particular hardware support but has the disadvantage that, if the forwarding databases were large, a large amount of information exchange would be required. The information exchange would occur regardless of whether any other units required the forwarding database contents in order to control their user traffic.

Rather than having all units in the fabric share their forwarding database information indiscriminately, the present invention relies on specific events for initiating the forwarding of database information from a unit.

In normal bridge operation (for example in accordance with IEEE Standard 802.1d), MAC addresses in the forwarding databases are continually refreshed so long as traffic continues to arrive from the MAC address. This continual refreshing effectively suspends the aging out and removal of the MAC addresses from the forwarding databases. Where a forwarding database has been populated with a MAC address as a result of explicit synchronization, the MAC address would not have been seen as a source address by the unit and so the normal refresh of the address wouldn't occur. Various schemes for dealing with aging are described later.

Static Addresses

A forwarding database of a bridge may be directly populated with a number of MAC addresses as the result of requests from a management entity. These forwarding database entries are termed "static" and must continue to be present until management requests that they be removed.

Where static addresses are added to the fabric, all units within the fabric should populate their forwarding databases consistently with each other so that traffic arriving at any port on any unit within the fabric would always be forwarded to the required egress port with no flooding.

Aggregated Links

Bridges may support aggregated links where the port members of a link may be distributed amongst the units of a fabric.

Traffic may be received on any member port of an aggregated link and be treated as if it was from a single logical link and, likewise, traffic transmitted to an aggregated link may be transmitted to any of the member ports in accordance with some traffic distribution algorithm, but, to avoid duplication, each frame must be transmitted to only one member port. This presents a problem where an aggregated link spans more than one unit in the fabric because, effectively, more than one VBridge would have a direct connection to the same logical link. Additional inter-unit communication is required to resolve the problem.

Since an aggregated link is a single logical connection, any identification index for that aggregated link needs to be coordinated between all units in the fabric. For example, all units within a fabric would coordinate and agree on a common 'ifindex' for each aggregated link and, where the aggregated link is referenced in a protocol data unit, all units would use the same value of the reference.

For the purposes of transmitting and receiving protocol data units on the aggregated link where the protocol considers the aggregated link to be a single logical link (such as STP), each unit on the fabric must coordinate so that protocol data units are handled consistently. An example of a way in which this could be achieved is to nominate an "owner" unit for each aggregated link and only to allow that unit to process protocol data units for the aggregated link. Other units would forward any protocol data units to the owner unit for processing and only the owner unit would forward protocol data units to the aggregated link.

Address Learning

Any addresses learnt against an aggregated link must be learnt against the aggregated link itself rather than the member ports. This ensures that any traffic destined to the learnt address can be forwarded to an aggregated link member port according to the traffic distribution algorithm.

Where traffic arrives at a unit through a fabric port, and where the traffic was originally received into the fabric through an aggregated link, the unit must learn the traffic's source MAC address against the aggregated link rather than its fabric port. This then allows the units VBridges to forward traffic destined to that MAC address according to the fabric's aggregated link traffic distribution algorithm. Where forwarding databases are synchronized implicitly by allowing the learning of MAC addresses against fabric ports, this learning against the aggregated links can only be achieved if additional information is embedded in the traffic. The extra information must indicate if the fabric originally received the traffic through an aggregated link and, if so, which aggregated link. The embedding of the extra information would normally require the support of the switch hardware.

Where each units VBridges are learning addresses independently of their counterparts in the other units in the fabric, and where forwarding database synchronization is only achieved implicitly, this can result in some units in the fabric learning an address against an aggregated link and other units not. In the example shown in FIG. 8, traffic flows from host A to host B via the member link of aggregated link 1 that is on unit 2. Unit 2, therefore, gets an opportunity to learn MAC address A against aggregated link 1 whereas unit 2 does not. Likewise, since traffic flows from host B to host A via the member link of aggregated link 2 that is on unit 1, unit 1 gets the opportunity to learn MAC address B whereas unit 2 does not. In this scenario, traffic destined for MAC address B would be flooded by unit 2 indefinitely and traffic destined for MAC address A would be flooded by unit 1 indefinitely.

To avoid excessive traffic flooding it is highly desirable that where distributed aggregated links are supported, explicit forwarding database synchronization also be supported.

Distribution

A consequence of the provision of a distributed fabric is a requirement that the units in the fabric appear to implement the control protocols as a single position in the network topology only once even though several units may cooperate to share the implementation of a particular protocol.

It is not a requirement that the implementation of each protocol be distributed across all of the units in a fabric, but it is desirable that traffic connectivity should be recovered quickly if any unit or any fabric link should fail. Where a protocol implemented in only one unit (the "master" unit for that protocol), it may be necessary for an implementation to share the protocol state information amongst all units in the fabric for backup purposes ready for the failure of the master unit. This may be achieved as described in our prior application No. 0408947.0

Synchronization Events

Figure 9:
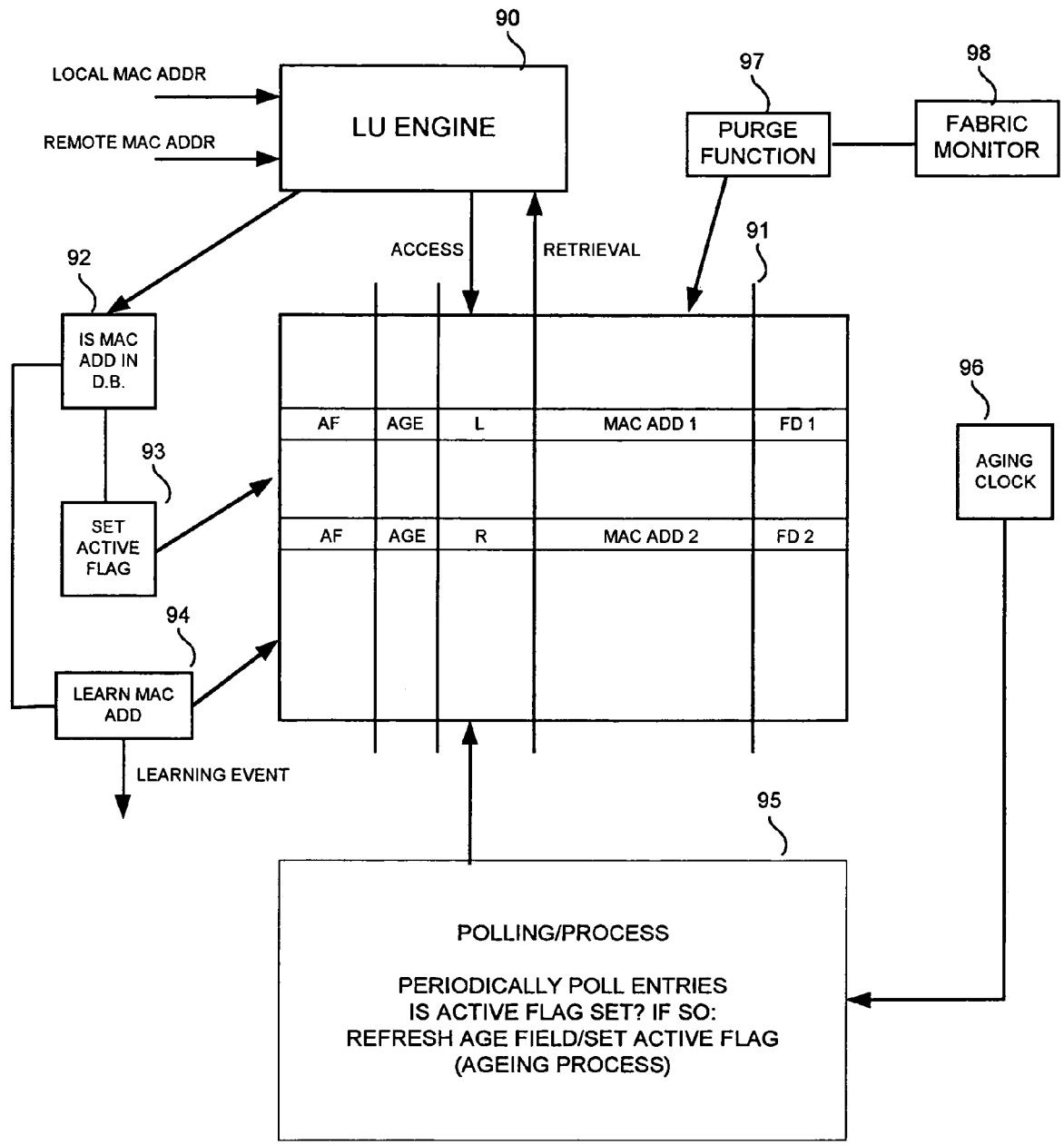
FIG. 9 illustrates one example of a forwarding database and its operation according to the invention.

FIG. 9 illustrates an example of the operation of a forwarding database suitable for use in the present invention. A lookup (LU) engine 90 controls a forwarding database 91. The database 91 contains entries each comprising an 'active' flag field (AF), an age field (AGE) and a unit ID field, which will indicate whether the entry was sourced locally or from another, 'remote' unit in the fabric. This field could in some circumstances merely distinguish between 'local' and remote but preferably indicates unit ID of the unit (usually a number), within the fabric, which was the 'source' unit for the MAC address. Each entry includes the relevant MAC address, e.g. MAC ADD 1, MAC ADD 2 etc. and the relevant forwarding data FD1, FD2 etc.

The organization of the look-up (LU) engine 90 depends on that of the database 91, which may be a tree-type, a trie type or other type according to preference. The primary task of the look-up engine 91 is to respond to an input MAC address of a frame to obtain forwarding data, such as a port mask, which will determine the port or ports from which the frame will be forwarded.

Shown separately from the LU engine for convenience, but in practice part of the LU engine, are two functions which may be implemented in hardware. Block 92 determines whether an input MAC address is already in the database. If it is not, then the MAC address is learned (block 93), i.e. is made the subject of a new entry comprising the MAC address and its forwarding data. If the MAC address is already in the database the active flag field AF will be set (block 93)

The database is also periodically polled by an aging engine 95, which may be constituted by software process and has recourse to an aging clock 96. The entries in the database are examined in turn to determine whether the 'active' flag is set. If so, the flag is cleared and the age field refreshed, e.g. reset to the current time indicated by the aging clock or reset to zero if the aging convention dictates. In the former case the test for an over-age entry is performed by subtracting the time in the age field from a current time; in the latter case the test requires testing the age in the age field against an age limit.

FIG. 9 also includes a purge function 97 controlled by a 'fabric monitor' 98, which will be described later.

Figure 10:
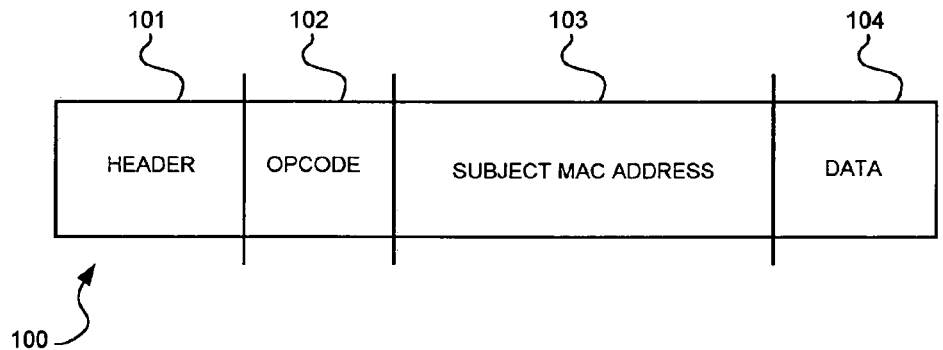
FIG. 10 illustrates a maintenance packet

Explicit synchronization requires the sending of internal maintenance packets between the units of the fabric. One such packet is shown in FIG. 10. it includes a header, organized in any suitable manner to ensure that it will egress only from a fabric port, an operation code for recognition by receiving units, a MAC address and relevant data (as will be described).

In what follows three techniques for explicit synchronization will be described. They differ both in respect of the 'events' which are communicated across the fabric and the actions taken in response to those events. They are conveniently described as, respectively, 'Learning events only sent', 'Learning and Aging events sent' and 'Learning events with aging requests'.

Learning Events Only Sent

In this technique each unit will broadcast a learnt address to the rest of the fabric when the address gets added to the local address database. Periodically each unit will sequence through its database checking for addresses to age out. Both locally and remotely sourced addresses will be aged out if found to have been inactive for the aging period and allowed to be aged out. For locally sourced addresses the hardware will be interrogated to determine whether the address has been active or not If the address is still active an "address active" message will be broadcast to the rest of the fabric. If the address has been inactive for the aging period then the address is removed from the database and no message is sent. For remotely sourced addresses, if an "address active" message has not been received within the last aging period then the address will be removed from the Address Database.

Figure 11:
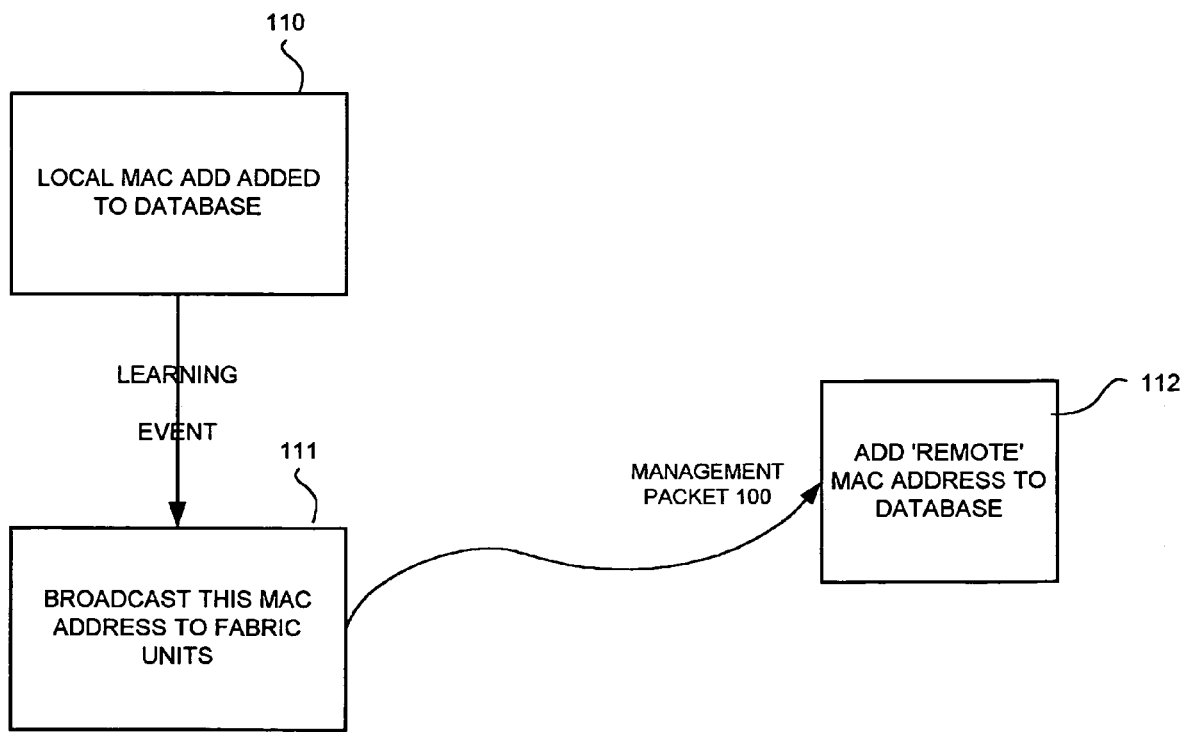
FIG. 11 illustrates the broadcasting of a leaning event
Figure 12:
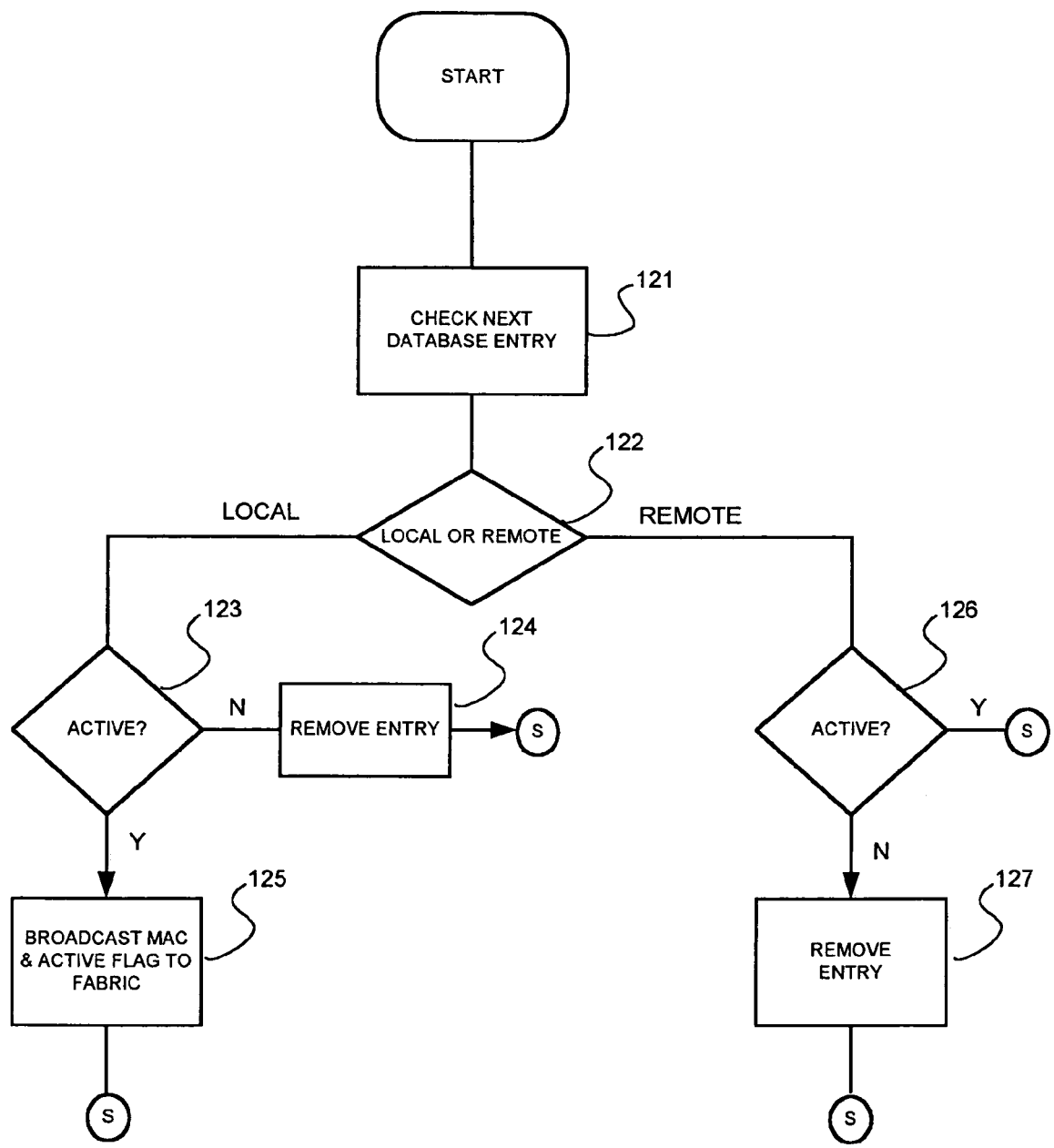
FIG. 12 illustrates one example of the control of aging of entries in forwarding databases in the distributed fabric.

FIGS. 11 and 12 illustrate schematically the organization of explicit synchronization in which only 'Learning events' are broadcast as just outlined. In this technique a unit will inform other units by means of maintenance packets of the addition of a MAC address to its database and the detection of 'active' locally sourced addresses.

In particular, as shown by blocks 110 and 111, when the local unit adds a MAC address to the respective local database 91 (FIG. 9) the unit will broadcast a maintenance packet (FIG. 10) containing this MAC address to the other units of the fabric. Each other unit will add the MAC address to its database (block 112) as it would a normally locally sourced MAC address but would set the local/remote field to remote. If this filed is intended to contain the Unit ID, the packet 100 will include a data field containing the Unit ID of the MAC address's source unit.

Also, if a unit in response to the MAC address of a packet discovers that the MAC address is already in the database (block 92), it will, in addition to setting the active flag AF, broadcast to the rest of the fabric a maintenance packet identifying the MAC address and the fact that the address is active (by means of a suitable flag). Such a packet will have, for example, an operation code that will prevent its causing the retransmission of an 'address active' message to the rest of the fabric when the active flag for the MAC address is set in a database other than that address' source unit. The LU engine may alternatively be organized to the same effect so as to transmit an address active message only in respect of locally sourced addresses.

Periodically, as indicated by block 95 in FIG. 9, each unit sequences through its database checking for addresses to age out. Both local and remote addresses will be aged out of they have been inactive (as shown by a 'clear' active flag).

Thus as shown in FIG. 12, each database entry is checked, block 121 to determine whether it is local or remote (decision 122). If the address is local it is checked to see whether it is active, has had the active flag set since the previous refresh. If the address is not active, it is removed (block 124) from the database and the routine returns to the start (S) to check the next entry. If the (local) address is active, then an "address active" message is broadcast (block 125) to the rest of the fabric. If the address is remote then it is checked to see whether it is active (decision 126). If it is active no action is taken. If the address is inactive, the database entry is removed ((block 127).

One advantage of this technique is that over-age addresses (whether local or remote) will not linger in the database. Once a unit stops sending "address active" messages in respect of a particular MAC address the other units within the fabric will age out the address from their own databases albeit only at the end of an aging period. Furthermore the addresses would propagate across the fabric reasonably quickly and 'flooding' of unknown addresses can be reduced to a minimum.

However, the amount of maintenance traffic as a result of the "address active" messages plus the "address learnt" messages could be quite large. There would be one "Address Active" message for every entry in the Address Database sent to every unit in the fabric, every aging period. Also, if an "address active" message is lost, remotely sourced addresses may be prematurely aged out, resulting in the 'flooding' of an address unknown to one of the databases other than the source database Learning and Aging Events Sent In this technique, each unit, within the fabric, sends out learning events to the entire fabric as before. When a source unit of an address determines that the address should be aged out of the address database, it sends out an aging message to the entire fabric, i.e. a maintenance frame as shown in FIG. 10 with a data flag denoting that the address has been aged out of the source unit's database. The individual units only routinely age out locally sourced addresses, informing the rest of the fabric; remotely sourced addresses are removed from the address database as a result of the reception of an "address aged" message from that address's source unit.

Figure 13:
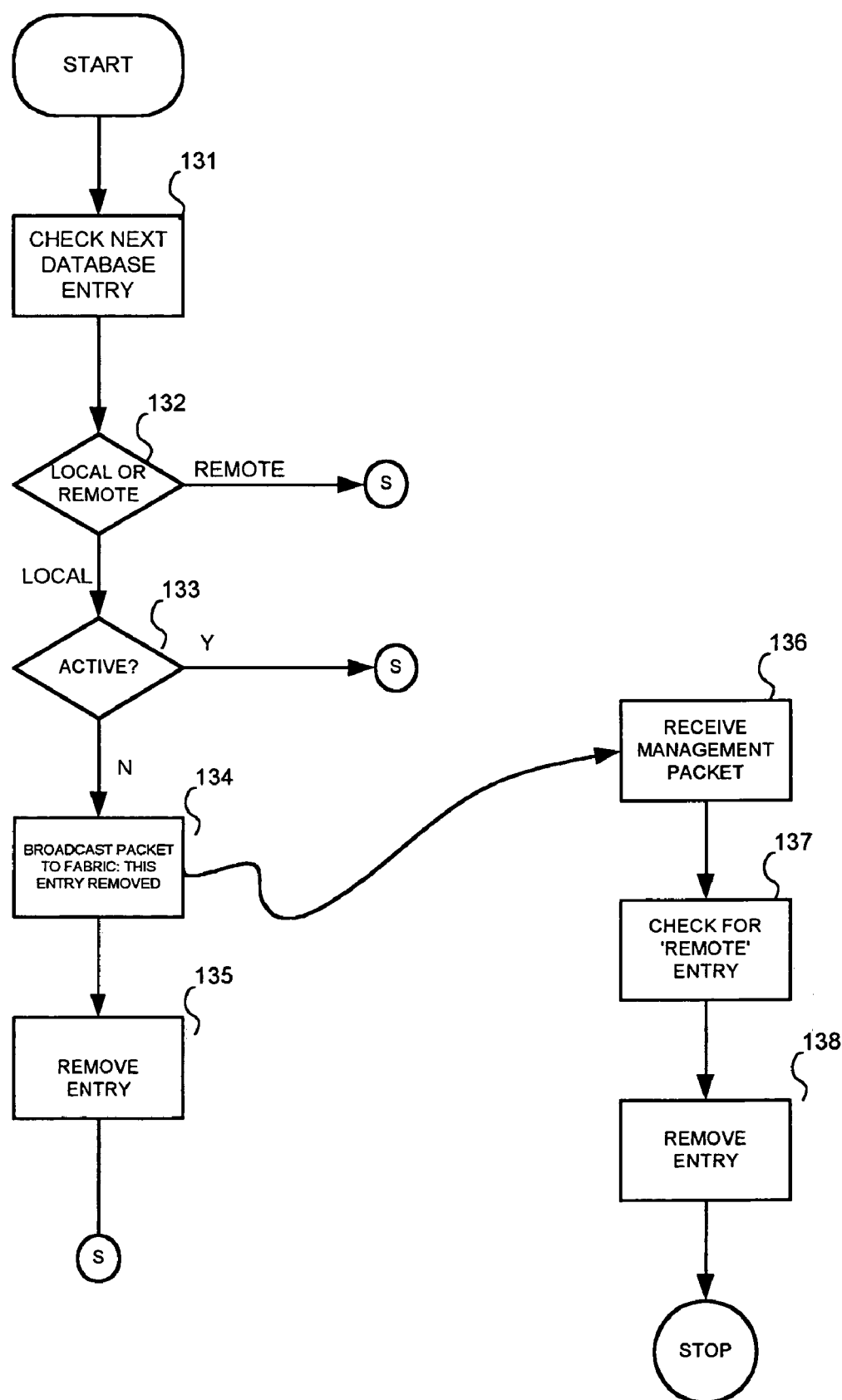
FIG. 13 illustrates another example of the control of aging of entries in forwarding databases in the distributed fabric.

This technique employs the same broadcasting of 'learning events' as described with reference to FIG. 11. The aging engine is organized as shown in FIG. 13. Each database entry is checked, block 131, to determine whether it is local or remote (decision 132). No action is taken if the address is 'remote' If the address is local it is checked to see whether it is active (decision 133). If the (local) address is active there is no action. It the address is not active, the unit sends an "address removed" message to the rest of the fabric (block 134) and the entry is removed (block 135).

When a unit in the fabric receives such an "address removed" packet, (block 136) it checks its database for the entry (block 137) and removes the entry (block 138).

This second technique would generate less maintenance traffic than the "Learning events only" technique, because there is only one "address added" and one "address removed" message throughout the life of that address on the given VLAN/port combination. The propagation of addresses across the fabric and the reduction of 'flooding' are similar to the previously described technique. Moreover, addresses will be aged out from the remaining units within the fabric reasonably quickly.

If however any "address removed" message is lost an address may remain indefinitely in the remote unit's database. If the delivery mechanism could guarantee delivery and processing of the synchronization messages then this possible disadvantage would be avoided.

Learning Events with Aging Requests

A combination of the two previous options would be to have each unit broadcast its learning events to the fabric, and to have each individual unit age its address database contents. When a unit determines that a remotely sourced address needs to be aged then instead of actually performing the removal straight away, a request is made to the source unit to determine whether the address is still active or not. If the source unit responds that the address is no longer active then the address can be removed from the local address database—if the source unit responds that the address is still active then the address age is reset and it is left in the database. If no response is received from the source unit, the address should be removed from the address database.

Figure 14:
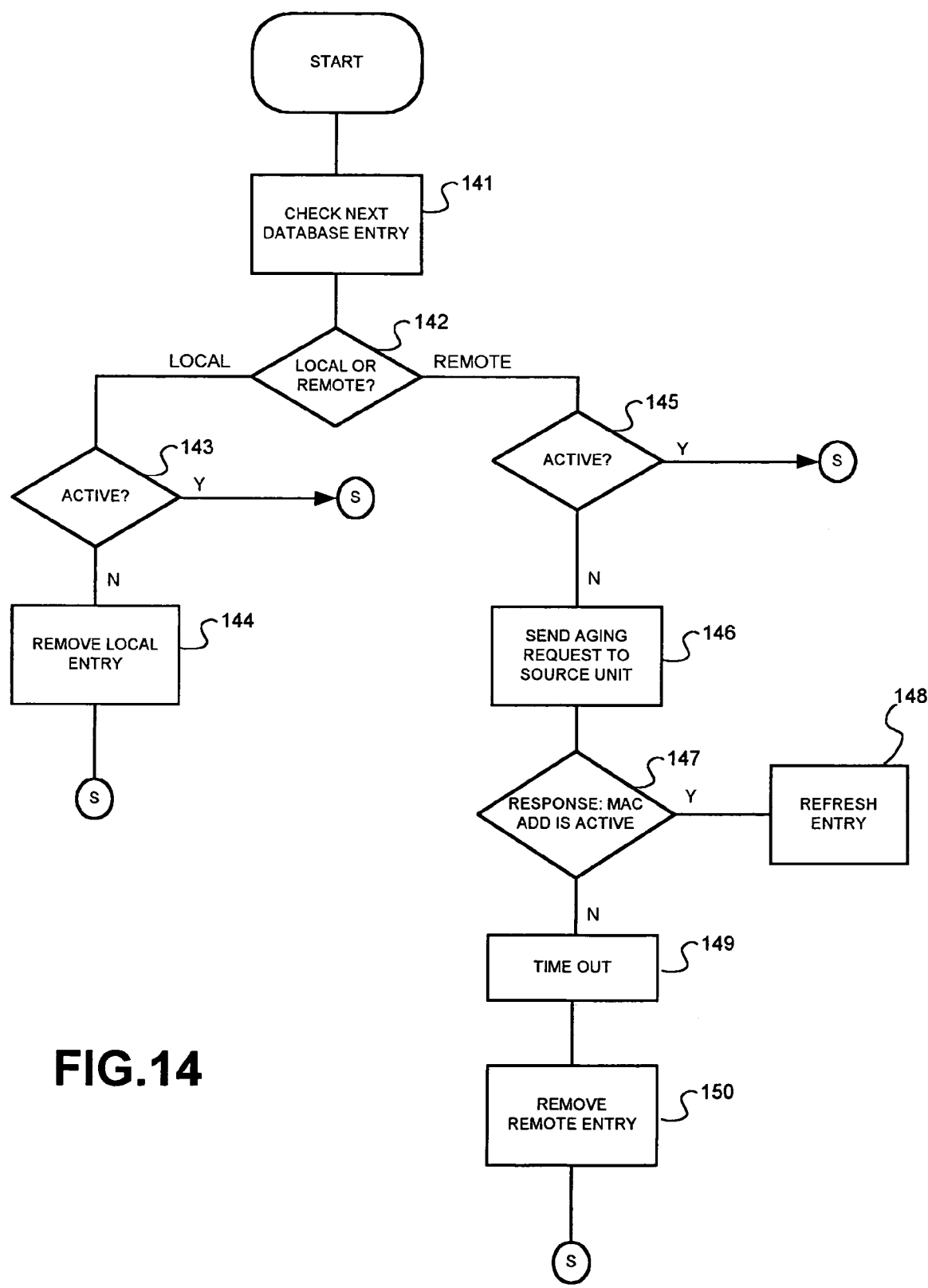
FIGS. 14 and 15 illustrate another example of the control of aging of entries in forwarding databases in the distributed fabric.
Figure 15:
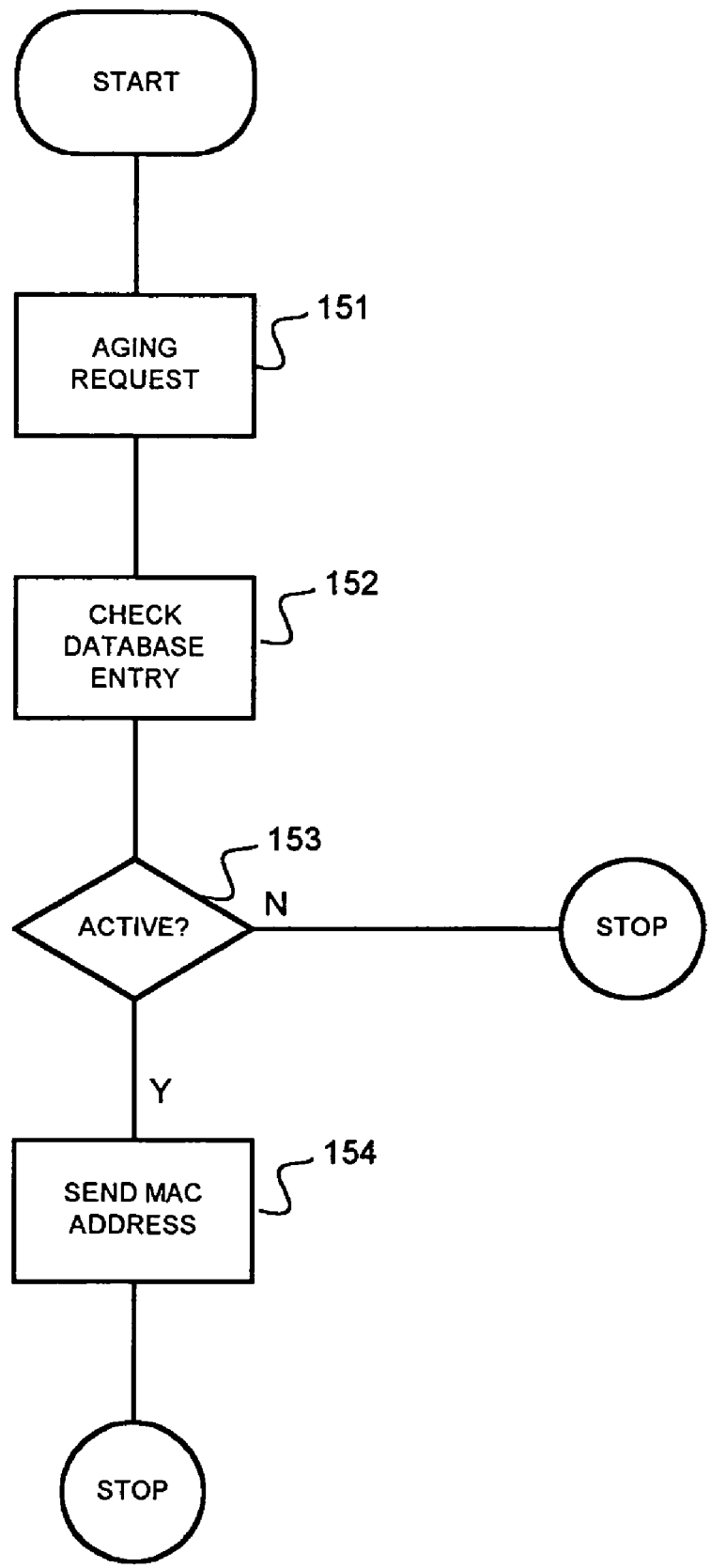

More particularly, in this technique the broadcasting of learning events proceeds as described with reference to FIG. 11. The aging process is shown in FIGS. 14 and 15. The aging engine polls each entry in turn (block 141). If the address is locally sourced (decision 142) it is checked to see whether it is active (decision 143). If so, no action is taken and the next entry is polled. If the (local) entry is inactive, it is removed (block 144). If the address is remotely sourced (decision 142) is checked to see whether it is active (decision 145). Again, no action is made in respect of this entry if the address is active. If the address is not active, an "aging request" is sent to that address's source unit, as identified in the entry, and a timer is started. The action of the source unit is shown in FIG. 15. On receipt of the "aging request" (block 151) it checks the relevant database entry (block 152) to see whether it is active (decision 153). If it is not no action is taken. If the address is active, the source unit sends an "address active" message back to at least to the requesting unit (block 154). The requesting unit, determines whether is has received an "address active" message for this address within a predetermined time (decision 147 and time out 149). If the "address active" message has been received, the entry is refreshed (block 148). If the timer times out without reception of the "address active" message, the entry is removed (block 150).

This technique has the advantages that an over-age address cannot get remain in the address database, the addresses will propagate across the fabric reasonably quickly, flooding is reduced to a minimum and addresses will be aged out from the units within the fabric reasonably quickly. However, the amount of maintenance traffic would be double that of the technique compared to that described with reference to FIG. 13.

Changes to a Fabric

There is a choice of actions to take when a fabric changes, i.e when a unit is added to or removed from a fabric. There are broadly two possible options available, purging the databases or resynchronization of them.

Purge Databases

This option means that when a unit gets added to a fabric the address databases on all the fabric units are purged. All addresses are removed and the newly formed fabric starts with an unoccupied address database. This does not require synchronization of existing addresses or any additional maintenance traffic overhead during the forming of a new fabric. However there will be flooding of addresses previously learnt, even though data traffic paths may have been unaffected by the change.

The purging option is also applicable when a unit leaves the fabric. In this case the remaining units purge their databases of all addresses that were sourced from the unit that has departed. If they did not, owing to the absence of the source unit for those addresses, and the consequent absence of sending or response to relevant aging events, the forwarding databases could remain populated indefinitely with those addresses.

Reverting to FIG. 9, a purging function 97 will depending on the fabric 'event' either purge the database entirely (e.g. when a unit joins the fabric) or purge the database of those entries which have been sourced from a now absent unit.

It is known from for example GB patent 2383507 for the units in a fabric to exchange control frames by means of which each of the units in a fabric has information on the operational status of each of the other units and it is proposed in Goodfellow et al., U.S. Ser. No. 10/751,930 filed 7 Jan. 2004 and commonly assigned herewith for the units in a fabric to exchange 'fabric protocol' packets which provide (among other things) similar information. A 'fabric monitor' 98 implemented according to either scheme (or otherwise) therefore has sufficient information for the control of the purging function 97.

The purging of a database of those addresses which have been sourced from a particular (now absent) unit makes the use of a unit 1D field desirable in the database.

Re-Synchronize Databases

This option means that when a unit gets added to a fabric the address databases of all the units of the newly formed fabric are merged together to form a single, consistent database on all the units. This could be achieved by each unit in the fabric broadcasting the contents of the address database which were sourced on itself, or possibly a single nominated unit within the fabric could broadcast the entire contents of its address database.

Figure 16:
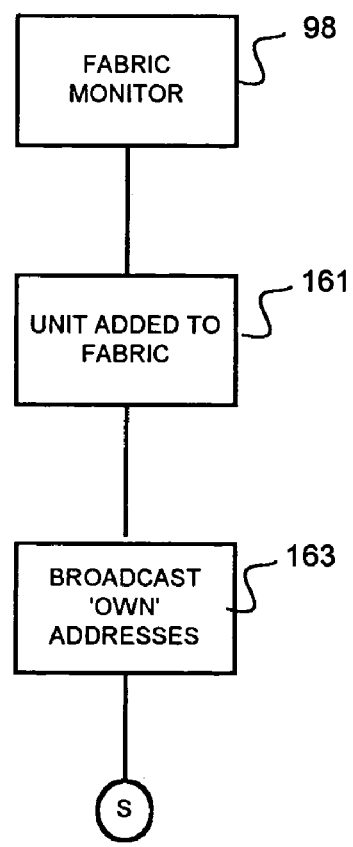
FIG. 16 illustrates an example of resynchronization of a database.

FIG. 16 shows the process by way of example for one of the units. The status of the fabric units is monitored for example by means of a fabric monitor 98 (FIG. 9). If a unit has been added (block 161), the database is 'resynchronized', in this example by broadcasting (by means of maintenance packets) those addresses sourced on the respective unit (block 1623). Each remaining unit in the fabric will 'resynchronize' in like manner.

I claim:

1. A network unit for use in a distributed bridging fabric, the network unit comprising:
    (a) a multiplicity of user ports for the transmission of data frames to and from an external network;
    (b) at least one fabric port for the transmission of frames between said network unit and another network unit in the distributed bridging fabric;
    (c) a forwarding database for containing entries each including a media access control address;
    (d) a lookup engine organized for the insertion of an entry into said forwarding database on receipt of a data packet at a user port and for the broadcast via each fabric port of an "address added" message identifying a respective media access control address, said lookup engine responding to such an "address added" message received from another network unit in the distributed bridging fabric to make a corresponding entry in the database; and to annotate an entry to indicate activity of an address in response to an address which is already in said database; and
    (e) an aging engine organized for the polling of entries in the database, said aging engine refreshing an entry for which the respective media access control address is annotated as active and organized for the selective removal of inactive entries from the database.

2. A network unit as in claim 1 wherein each entry includes a source field indicating whether the respective media access control address was derived from a packet for which the network unit or another network unit in the distributed bridging fabric was the source unit for that packet within the distributed switching fabric.

3. A network unit as in claim 2 wherein the source field identifies said source unit.

4. A network unit as in claim 3 wherein the aging engine determines in respect of a polled entry whether the corresponding media access control address has the network unit as the source unit for that address within the distributed bridging fabric and
    (i) if the address has the network unit as its source unit and is inactive, removes the entry;
    (ii) if the address has another network unit in the distributed bridging fabric as its source unit and is inactive, sends an "aging request" message in respect of that address to said another network unit; and
    (iii) in the absence of a response from said another network unit that the address is active, removes the entry.

5. A network unit as in claim 2 wherein said aging engine is organized to determine whether an address is active, to remove entries for which the corresponding media access control address is inactive and to cause the broadcast to other network units in the distributed bridging fabric of an "address active" message in respect of active addresses for which the network unit was the source unit within the distributed bridging fabric for that address.

6. A network unit as in claim 2 wherein said aging engine is organized to remove all entries which are over-age and to broadcast to other network units in the distributed bridging fabric an "address removed" message in respect of an over-age address which has the network unit as its source unit.

7. A network unit as in claim 6 wherein the aging engine responds to an "address removed" message to remove the corresponding entry from the database.

8. A network unit as in claim 1, including a monitor of the other network units in the distributed bridging fabric and organized to purge the database at least partially on the occurrence of a change in the number of network units in the distributed bridging fabric.

9. A network unit as in claim 8 wherein the network unit responds to the addition of another network unit to the distributed bridging fabric to purge the database of all entries sourced by any network unit in the distributed bridging fabric.

10. A network unit as in claim 8 wherein the network unit responds to the removal of one of the other network units from the distributed bridging fabric to purge those entries sourced by the now absent unit.

11. A network unit as in claim 1, including a monitor of the other network units in the distributed bridging fabric and organized to effect resynchronization of the database on the occurrence of a change in the number of network units in the distributed bridging fabric.

12. A network unit as in claim 11 wherein the network unit is organized to broadcast to the other network units messages containing those addresses for which it is the source unit.

13. A distributed bridging fabric comprising:
   a multiplicity of network units mutually organized to constitute a single network entity, wherein:
   each network unit has a respective multiplicity of user ports for the transmission of data frames to and from an external network, at least one distributed bridging fabric port for the transmission of frames between that network unit and another network unit in the distributed bridging fabric;
   each network unit has a respective forwarding database for containing entries each including a media access control address;
   each network unit has a respective lookup engine organized for the insertion of an entry into said respective forwarding database on receipt of a data packet at a user port and for the broadcast via each distributed bridging fabric port of an "address added" message identifying a respective media access control address, said respective lookup engine responding to such an "address added" message received from another network unit in the distributed bridging fabric to make a corresponding entry in the respective database; and to annotate an entry to indicate activity of an address in response to an address which is already in said respective database; and
   each network unit has a respective aging engine organized for the polling of entries in the database, said respective aging engine refreshing an entry for which the media access control address is annotated as active and organized for the selective removal of inactive entries from the respective database.

14. A distributed bridging fabric as in claim 13 wherein each entry includes a source field indicating the source network unit within the distributed bridging fabric for a packet having that media access control address.

15. A distributed bridging fabric as in claim 14 wherein the respective aging engine determines in respect of a polled entry whether the corresponding media access control address has the respective network unit as the source unit for that address within the distributed bridging fabric and
   (iv) if the address has the respective network unit as its source unit and is inactive, removes the entry;
   (v) if the address has another network unit in the distributed bridging fabric as its source unit and is inactive, sends an "aging request" message in respect of that address to said another network unit; and
   (vi) in the absence of a response from said another network unit that the address is active, removes the entry.

16. A distributed bridging fabric as in claim 13 wherein said respective aging engine is organized to determine whether an address is active, to remove entries for which the corresponding media access control address is inactive and to cause the broadcast to other network units in the distributed bridging fabric of an "address active" message in respect of active addresses for which the respective network unit was the source unit within the distributed bridging fabric for that address.

17. A distributed bridging fabric as in claim 13 wherein said respective aging engine is organized to remove all entries which are over-age and to broadcast to other network units in the distributed bridging fabric an "address removed" message in respect of an over-age address which has the respective network unit as its source unit.

18. A distributed bridging fabric as in claim 17 wherein the respective aging engine responds to an "address removed" message to remove the corresponding entry from the respective database.

19. A distributed bridging fabric as in claim 13, wherein each network unit includes a respective monitor of the other network units in the distributed bridging fabric and organized to purge the respective database at least partially on the occurrence of a change in the number of network units in the distributed bridging fabric.

20. A distributed bridging fabric as in claim 19 wherein the network unit responds to the addition of another network unit to the distributed bridging fabric to purge the database of all entries sourced by any network unit in the distributed bridging fabric.

21. A distributed bridging fabric as in claim 19 wherein the network unit responds to the removal of an other network unit from the distributed bridging fabric to purge those entries sourced by the now absent network unit.

22. A distributed bridging fabric as in claim 13, wherein each network unit includes a respective monitor of the other network units in the distributed bridging fabric and organized to effect resynchronization of the database on the occurrence of a change in the number of network units in the distributed bridging fabric.

23. A distributed bridging fabric as in claim 22 wherein each network unit is organized to broadcast to the other network units in the distributed bridging fabric messages containing those addresses for which it is the source unit.

24. A method of operating a network unit in a distributed bridging fabric, the network unit comprising a multiplicity of user ports for the transmission of data frames to and from an external network and at least one distributed bridging fabric port for the transmission of frames between said network unit and another network unit in the distributed bridging fabric, the method comprising:
   (a) operating a forwarding database to contain entries each including a media access control address;
   (b) inserting an entry into said forwarding database on receipt of a data packet at a user port;

(c) broadcasting via each distributed bridging fabric port an "address Added" message identifying a respective media access control address;

(d) responding to such an "address added" message received from another network unit to make a corresponding entry in said forwarding database;

(e) annotating an entry in the database to indicate activity of an address in response to an address which is already in said forwarding database;

(f) examining entries in said forwarding database in turn;

(g) refreshing an entry for which the respective media access control address is annotated as active; and (h) selectively removing inactive entries from said forwarding database.

25. A method as in claim 24 wherein each entry includes a source field indicating whether the respective media access control address was derived from a packet for which the network unit or another network unit was the source unit for that packet within the distributed bridging fabric.

26. A method as in claim 25 wherein the source field identifies said source unit.

27. A method as in claim 26 further comprising determining whether an address is active, removing entries for which the corresponding media access control address is inactive and broadcasting to other network units in the distributed bridging fabric an "address active" message in respect of active addresses for which the network unit was the source unit within the distributed bridging fabric for that address.

28. A method as in claim 26 further comprising removing from said forwarding database all entries which are over-age and broadcasting to other network units in the distributed bridging fabric an "address removed" message in respect of an over-age address which has the network unit as its source unit.

29. A method as in claim 28 further comprising responding to an "address removed" message to remove the corresponding entry from said forwarding database.

30. A method as in claim 26 further comprising determining in respect of a entry in said forwarding database whether the corresponding media access control address has the network unit as the source unit for that address within the distributed bridging fabric and (a) if the address has the network unit as its source unit and is inactive, removing the entry;

(b) if the address has another network unit as its source unit and is inactive, sending an "aging request" message in respect of that address to said another network unit; and (c) in the absence of a response from said another network unit that the address is active, removing the entry.

31. A method as in claim 24, further comprising monitoring other network units in the distributed bridging fabric and purging said forwarding database at least partially on the occurrence of a change in the number of network units in the distributed bridging fabric.

32. A method as in claim 31 further comprising responding to the addition of a network unit to the distributed bridging fabric to purge said forwarding database of all entries sourced by any network unit in the distributed bridging fabric.

33. A method as in claim 31 further comprising responding to the removal of a network unit from the distributed bridging fabric to purge those entries sourced by the now absent unit.

34. A method as in claim 24, further comprising monitoring other network units in the distributed bridging fabric and resynchronizing said forwarding database on the occurrence of a change in the number of network units in the distributed bridging fabric.

35. A method as in claim 24, further comprising broadcasting to the other network units in the distributed bridging fabric messages containing those addresses for which said network unit is the source unit.

* * * * *